(12) United States Patent
Manzano

(10) Patent No.: US 8,186,621 B2
(45) Date of Patent: May 29, 2012

(54) ASSEMBLY BETWEEN A FRONT FITTING AND THE TRACTION COUPLING OF THE TWO LATERAL BOXES OF THE HORIZONTAL STABILIZER OF AN AIRCRAFT

(75) Inventor: Carlos García Manzano, Madrid (ES)

(73) Assignee: Airbus Operations S.L., Getafe, Madrid (ES)

( * ) Notice: Subject to any disclaimer, the term of this patent is extended or adjusted under 35 U.S.C. 154(b) by 545 days.

(21) Appl. No.: 12/380,584

(22) Filed: Feb. 26, 2009

(65) Prior Publication Data

US 2010/0127127 A1    May 27, 2010

(30) Foreign Application Priority Data

Nov. 27, 2008 (ES) .................................. 200803379

(51) Int. Cl.
*B64C 1/26* (2006.01)
*B29C 65/50* (2006.01)
(52) U.S. Cl. ...................... 244/131; 244/119; 244/123.7
(58) Field of Classification Search .................. 244/131, 244/117 R, 119, 123.7, 211–215
See application file for complete search history.

(56) References Cited

U.S. PATENT DOCUMENTS

| | | | |
|---|---|---|---|
| 1,549,689 A * | 8/1925 | Rohrbach | 244/131 |
| 3,109,614 A | 11/1963 | Steidl | |
| 3,594,851 A | 7/1971 | Swatton | |
| 4,667,905 A * | 5/1987 | Hamm et al. | 244/123.13 |
| 7,806,367 B2 * | 10/2010 | Munoz Lopez et al. | 244/123.7 |
| 2002/0125369 A1 | 9/2002 | Milliere | |
| 2008/0001029 A1 * | 1/2008 | Garcia Laja | 244/99.3 |
| 2008/0128554 A1 * | 6/2008 | Pham et al. | 244/131 |
| 2008/0265093 A1 * | 10/2008 | Munoz Lopez et al. | 244/119 |
| 2008/0283675 A1 * | 11/2008 | Zuniga Sagredo | 244/35 R |
| 2009/0001218 A1 * | 1/2009 | Munoz Lopez et al. | 244/124 |
| 2009/0321575 A1 * | 12/2009 | Barroso Vloedgraven et al. | 244/131 |
| 2010/0108803 A1 * | 5/2010 | Arevalo Rodriguez | 244/99.2 |
| 2010/0148008 A1 * | 6/2010 | Hernando Sebastian et al. | 244/131 |

FOREIGN PATENT DOCUMENTS

EP   1988013 A2 *  11/2008
JP   05-286496   11/1993

* cited by examiner

*Primary Examiner* — Troy Chambers
(74) *Attorney, Agent, or Firm* — Klauber & Jackson LLC

(57) ABSTRACT

The invention relates to an assembly between a front fitting and the traction coupling of the two lateral boxes of the horizontal stabilizer of an aircraft comprising a front fitting (1, 1a and 1b), a front shear plate (2), an upper shear plate (4), a lower shear plate (5) and a "rib post" union piece (3) in such a way that the loads being transferred to the lateral boxes are minimized, and at the same time it allows a proper trimming of the horizontal stabilizer. Moreover, the present invention describes a compact front fitting, made of one piece, as a whole, and in composite material.

17 Claims, 9 Drawing Sheets

ASSEMBLY BETWEEN A FRONT FITTING AND THE TRACTION COUPLING OF THE TWO LATERAL BOXES OF THE HORIZONTAL STABILIZER OF AN AIRCRAFT

OBJECT OF THE INVENTION

As stated in the title of this descriptive specification, the aim of the present invention is to provide an assembly between a front fitting and a traction coupling of the two lateral boxes of the horizontal stabilizer of an aircraft, in such a way that said assembly minimizes the loads being transferred to the lateral boxes, and at the same time it allows a proper trimming of the horizontal stabilizer.

Another object of the present invention is to provide an assembly such that all the pieces forming it can be made of composite material, with the consequent saving in weight that this implies, a crucial saving in the aeronautical industry.

A third object of the present invention is to provide a compact front fitting, made of one piece and in composite material.

TECHNICAL FIELD OF THE INVENTION

As can be seen from the previous section, the present invention finds application in the aeronautical industry, in the technical field of aircraft structures, and particularly in the unions between front fittings and the coupling between the two lateral boxes of the horizontal stabilizer of an aircraft.

Specifically, it applies to the union between a front fitting and the traction coupling of the two lateral boxes of the horizontal stabilizer of an aircraft.

STATE OF THE ART PRIOR TO THE INVENTION

Lateral boxes or lateral torsion boxes of the horizontal stabilizer of an aircraft are well-known structures in the aeronautical industry and constitute one of the main structural elements of the horizontal stabilizer of an aircraft.

Accordingly, a torsion box is defined as a structure consisting of: spars, normally straight and arranged longitudinally in the structure; ribs, arranged transversely between the spars and attached to them; and a skin, arranged so that it covers the structure formed by spars and ribs, and attached to it.

The spars have the function of absorbing bending stresses; the ribs distribute the stresses to the spars and give shape to the skin, and the skin distributes the aerodynamic loads of lift and resistance which are applied on its aerodynamic surface to the ribs and spars. The torsion boxes also usually incorporate stiffeners, attached to the inner surface of the skin, which provide stability to the skin and prevent it from sagging.

Traditionally, in the state of the art, the couplings between lateral boxes are made by shear couplings, either by means of plates which join the skins of both lateral boxes or with somewhat more complicated pieces which join the skins of both lateral boxes, where said pieces are situated close to the plane of symmetry or are contained within it. As an example of such pieces we can cite the central rib or the front fitting. Moreover, traditionally, the requirements of narrow tolerances and high resistance mean that the manufacture of this type of piece usually leads to the use of materials that are expensive and difficult to machine, such as titanium for example, which substantially increases the manufacturing and assembly costs, as well as increasing the weight of the aircraft.

Furthermore, it is widely known that the aeronautical industry requires structures capable of withstanding the high loads that they are subjected to, meeting the demands for resistance and rigidity, requiring them to be as light as possible at the same time as meeting all the safety requisites demanded by the aviation authorities.

In this regard, traction couplings continue to be investigated in order to assess their potential saving, both in weight and in manufacturing and assembly costs, in order to improve the performance of an aircraft.

In recent years, traction couplings have been developed for joining parts of an aircraft and they are now being applied for couplings between small pieces of planes. Patent U.S. Pat. No. 6,415,496 describes a traction-compression coupling procedure of a detachable and/or fixed nature for applying to composite materials.

One of the fields of application of that patent is the traction coupling between the lateral boxes of the horizontal stabilizer of an aircraft. Nevertheless, for this type of traction coupling to be applied between the two lateral boxes of the horizontal stabilizer, it is first necessary to solve the problem raised by the union or assembly between that resulting traction coupling and the rest of the pieces situated in that zone.

Among the pieces situated in the zone where the traction coupling is produced between the two lateral boxes of the horizontal stabilizer is to be found the front fitting, a fitting which joins the front part of the mid-plane of the stabilizer with a worm which, when turned, causes the front part of the horizontal stabilizer to rise or lower and thereby rotate around a shaft situated in its rear part, varying the leading angle of the horizontal stabilizer. In other words, the front fitting serves to vary the height of the attachment of the horizontal stabilizer, thus allowing trimming of the stabilizer.

In addition, it has to be emphasized that the front fitting has to act as a fail-safe fitting, which makes the design of that zone even more difficult.

The result is that, as the coupling between the two lateral boxes of the horizontal stabilizer was traditionally a shear coupling and the aim now is to achieve a traction coupling, all the pieces forming the join or assembly between this traction coupling between the lateral boxes and the front fitting, as well as the actual front fitting and the manner of passing or transferring the loads to the lateral boxes, have to be restudied and redesigned with new concepts in order to adapt them to the new type of traction coupling.

Moreover, another consequence of the requisites of resistance, rigidity and lightening of the aeronautical structures is the ever more widespread use of composite materials in primary structures which, well applied, can imply major savings in weight and assembly compared to metallic designs.

In other words, the aim is to study the structure, the loads and the set of pieces situated around the traction coupling between the two lateral boxes of the horizontal stabilizer in order to find a more suitable way to join that coupling to the front fitting.

During the course of this specification, a composite material will be understood to be that which essentially consists of a resin or plastic material reinforced with fibers arranged in different orientations so that the mechanical properties of the material are optimized.

As well as the advantage of less weight, said composite material also has the advantage of an absence of fatigue and corrosion effects.

It was therefore desirable to be able to have an assembly between a front fitting and the traction coupling of two lateral boxes of the horizontal stabilizer of an aircraft, in which the fitting would keep its trimming functions intact and all the pieces comprising the assembly can be made of a composite material, at the same time as minimizing the loads transferred to the lateral boxes of the horizontal stabilizer.

SUMMARY OF THE INVENTION

The present invention has the aim of overcoming the problem created by the assembly between a front fitting and the traction coupling for the two lateral boxes of the horizontal stabilizer of an aircraft.

The objective of the present invention is to achieve a set of assembly or assemblage pieces that make possible the coupling between a front fitting and the traction coupling of the two lateral boxes of the horizontal stabilizer of an aircraft, where all the component pieces of said assembly are also pieces made of composite material, in order to improve the performance towards fatigue of the currently existing structures, facilitate their maintenance and lighten the structure of the aircraft.

Accordingly, the assembly forming the object of the present invention comprises:
- a front fitting,
- a front shear plate,
- an upper shear plate,
- a lower shear plate,
- a "rib post" union piece, which will join the proposed assembly to the central rib of the torsion box of the horizontal stabilizer of the aircraft.

According to the invention, the front fitting consists of a central body and two lateral parts, with the characteristics specified below. According to the invention, the central body of the front fitting is a body of rectangular base which presents a shape similar to that of a box, whose long lateral walls are arranged vertically and are parallel and symmetric to each other, and whose short lateral walls, upper and lower wall, are neither parallel nor symmetric to each other. Emerging from the lateral walls are individual lugs coplanar with said lateral walls. Each of the lugs possesses an opening. The lower short lateral wall is slightly concave with respect to the upper short lateral wall.

Likewise, each of the two lateral parts of the front fitting presents a lateral side symmetric to each of the long lateral walls of the central body of the fitting, considering the lateral wall with its lug and opening. So, each symmetric lateral side of each lateral part of the fitting copies the contour of the lateral wall, the lug and the opening of the central body of the fitting and possesses a projecting edge running along almost its entire outer contour, except for the contour corresponding to the lug.

The said lugs are coplanar with the lateral walls from which they emerge.

The front fitting can be separate in its three fundamental parts (central part plus two lateral parts) and these can be joined either during its manufacturing process or by means of a secondary gluing process.

Once the three fundamental parts have been joined together, the resulting fitting has two resulting lugs each of which has a lamina formed by the lug of the central body and the copy lug in the corresponding lateral part. So, a double load path is achieved. Moreover, in the case of one of the two sides of the resulting lug failing, the other one will be capable of withstanding the limit load, thereby complying with aviation requirements.

In an alternative embodiment, the central body of the front fitting is divided into two sub-halves.

In accordance with the invention, the front shear plate comprises a plate possessing two vertical folding lines that define a central zone, and two lateral zones. The front shear plate is responsible for joining the two spar webs of the two front spars arriving from each of the lateral boxes of the horizontal stabilizer and is also responsible for receiving the vertical load coming from the front fitting.

Moreover, in the alternative embodiment described above, in other words, the one in which the central body of the front fitting is divided into two sub-halves, it will also be responsible for providing the central body of the front fitting with continuity.

In accordance with the invention, the "rib post" union piece will be responsible for the union of the assembly with the central rib of the traction coupling between the boxes of the stabilizer. Said union piece has a "T" shape configuration and is attached to the front shear plate in the middle zone of its central zone, by means of processes of cocuring, cogluing or riveting. Its function is to join the central rib of the horizontal stabilizer of the aircraft to the front shear plate and transmit the vertical load of the front fitting to the central rib of the horizontal stabilizer.

As a result of the inclusion of the front shear plate, the vertical load introduced by the front fitting is transmitted by shear to the core of the front spars of the lateral boxes of the horizontal stabilizer and, by means of the "rib post" union piece, to the central rib of the stabilizer. The front shear plate also provides continuity for the shear load borne by the front spars of the lateral boxes of the horizontal stabilizer.

In accordance with an aspect of the invention, the upper and lower shear plates are two plates that have a characteristic shape such that they respectively copy the upper and lower shape or contour of the front fitting in order to join it to the upper and lower skins which form the torsion box and are extended beyond the area covered by the fitting, both laterally and towards the rear part of the stabilizer. In this way, the upper and lower skins forming the torsion box are successfully joined together. Moreover, in order to span the space occupied by the central rib, both upper and lower shear plates possess a slot.

The main function of the upper and lower shear plates is to react to the moment introduced into the structure by the vertical load introduced by the front fitting. Moreover, said plates give continuity to the traction-compression loads coming from the strands or upper and lower part of the front spars of both lateral boxes of the horizontal stabilizer.

Finally, the upper and lower shear plates are arranged in a way that completes the closure of the lateral boxes in the plane of union, considerably increasing their resistance to torsion.

The front fitting and each of the additional pieces forming the assembly described above are preferably manufactured starting from a sheet of resin reinforced with carbon fibers in the plane of the lamina, which is given a pre-form that is then cured.

Due to tolerance requirements, the preferred process for the manufacture of this tool will be RTM—Resin Transfer Molding.

For reasons of safety and better fastening of the system, the inner surfaces of the different plates making contact with each other are preferably fastened with rivets.

Also forming an object of the present invention is the described front fitting, made of one piece, in other words compact, and in composite material.

BRIEF DESCRIPTION OF THE FIGURES

The present invention will be entirely understood on the basis of the brief description appearing below and the accompanying drawings that are presented, by way of example only and therefore not being restrictive within the present invention and where:

FIG. 3a shows a view in exploded perspective of the component parts of the front fitting of the present invention;

Figure 1:
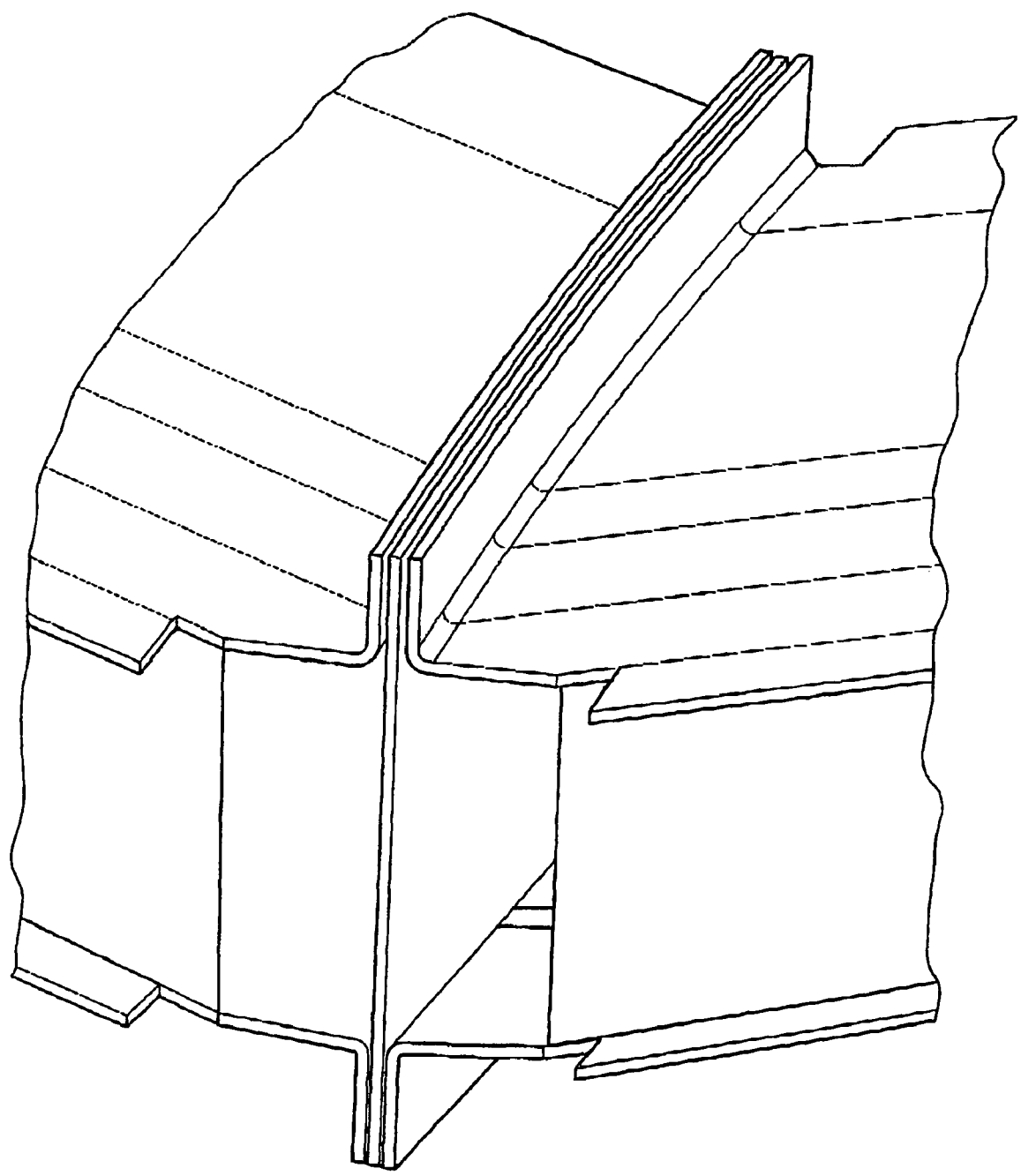
FIG. 1 shows a front view of the traction coupling between the two lateral boxes of the horizontal stabilizer of an aircraft.

Appearing in these figures are numerical references identifying the following elements:

1: central body of the front fitting
1a and 1b: lateral parts of the front fitting
1c: lateral wall of the central body (1) of the front fitting
1d: upper wall of the central body (1) of the front fitting
1e: lower wall of the central body (1) of the front fitting
1f: lug of the lateral walls (1c) of the central body (1) of the front fitting
1g: opening of the lugs (1f) of the lateral walls (1c) of the central body (1) of the front fitting
1h: lateral side of the lateral parts (1a and 1b) of the front fitting
1i: opening of the lateral sides (1h) of the lateral parts (1a and 1b) of the front fitting
1j: rectangular base of the central body (1) of the front fitting
1k: projecting edge of the lateral parts (1a and 1b) of the front fitting
2: central shear plate
2a: vertical folding lines of the central shear plate (2)
2c: central zone of the central shear plate (2)
2d and 2e: lateral zones of the central shear plate (2)
3: "rib post" union piece
4: upper shear plate
5: lower shear plate
6: front spars of the lateral boxes
7: resulting lug of the front fitting
8: slot in the upper and lower shear plates (4 and 5).

DETAILED DESCRIPTION OF THE EMBODIMENTS OF THE INVENTION

With the aim of arriving at a better understanding of the object and functioning of this patent, and without being understood as restrictive solutions, given below is a description of an embodiment of the invention based on the aforementioned figures.

Figure 1A:
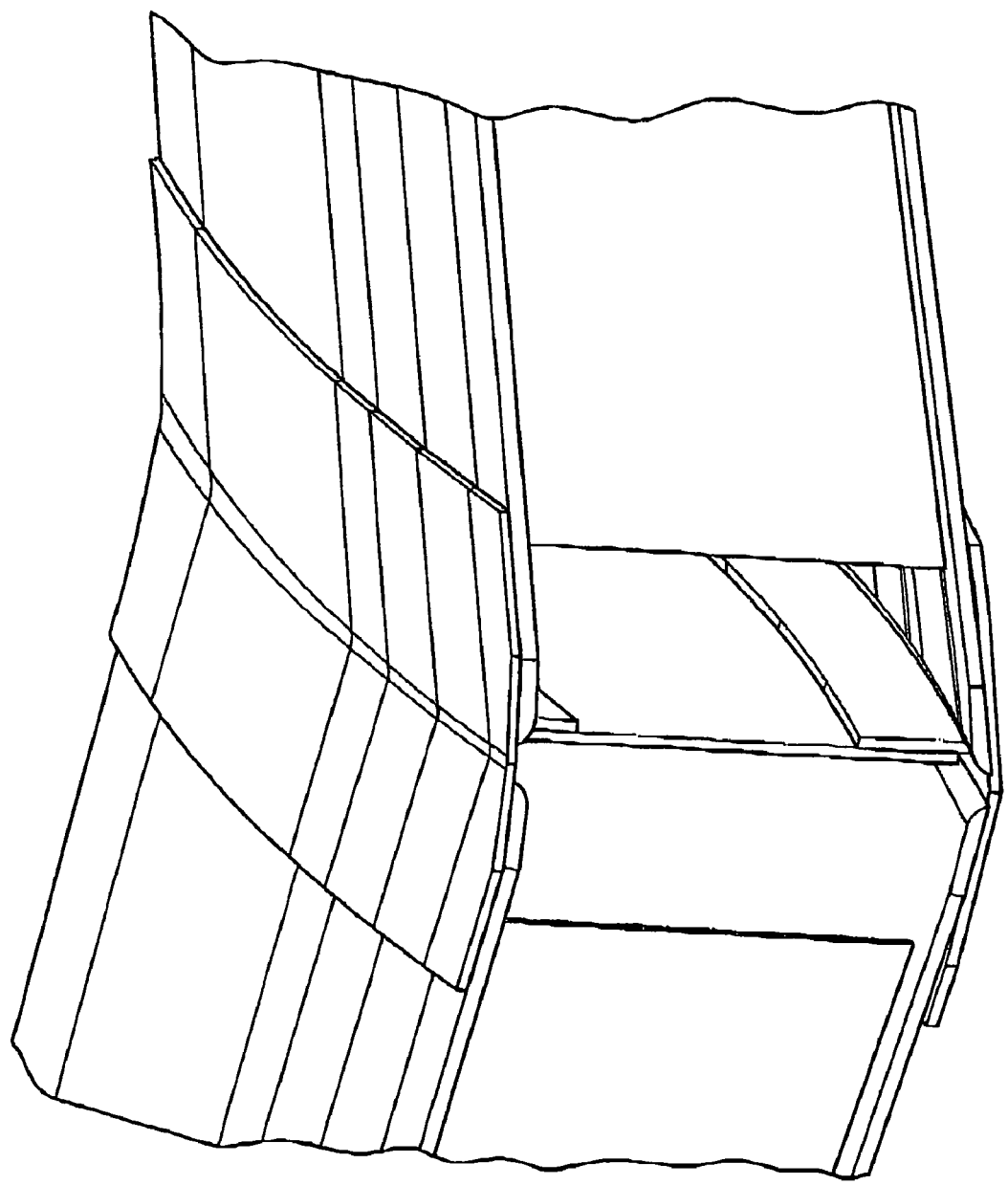
FIGS. 1a and 1b show a front view of a traditional shear coupling between the two lateral boxes of the horizontal stabilizer of an aircraft without any front fitting and with a front fitting respectively.
Figure 1B:
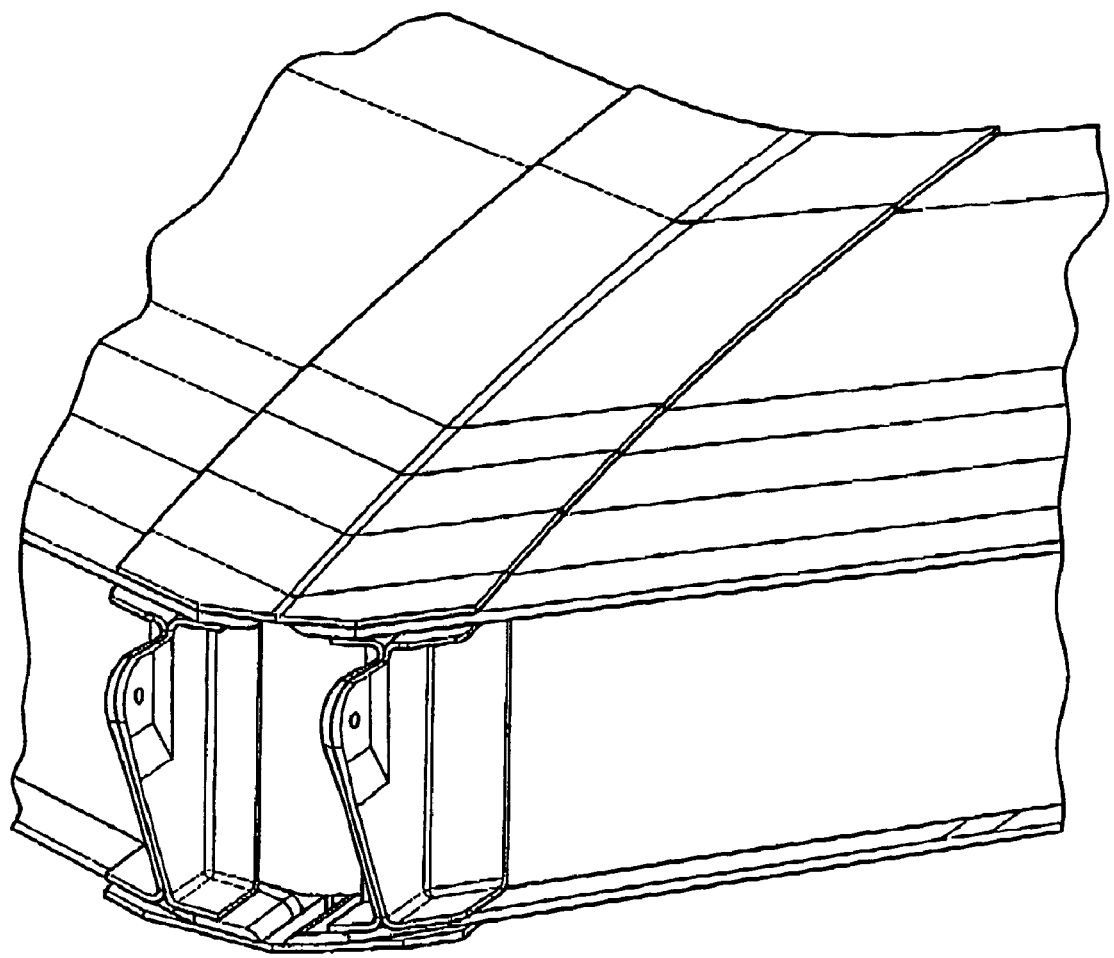

Accordingly, FIG. 1 shows how the traction coupling between two lateral boxes of the horizontal stabilizer of an aircraft would result, while FIG. 1a shows how the traditional shear coupling is between the two lateral boxes and FIG. 1b shows how the shear coupling of FIG. 1a is assembled with the front fitting. It can therefore be seen that the change in the geometry of this coupling makes it necessary to solve the problem of how its union or assembly is going to be with the rest of the pieces situated in that zone of the aircraft, such as a front fitting for example. In other words, the assembly has to be redesigned in such a way that the loads react properly.

Therefore, it is an object of the present invention to define the assembly such that the loads react properly, at the same time as making sure they do not interfere with the traction coupling between the lateral boxes of the horizontal stabilizer and that they allow a proper trimming of the horizontal stabilizer.

Figure 2:
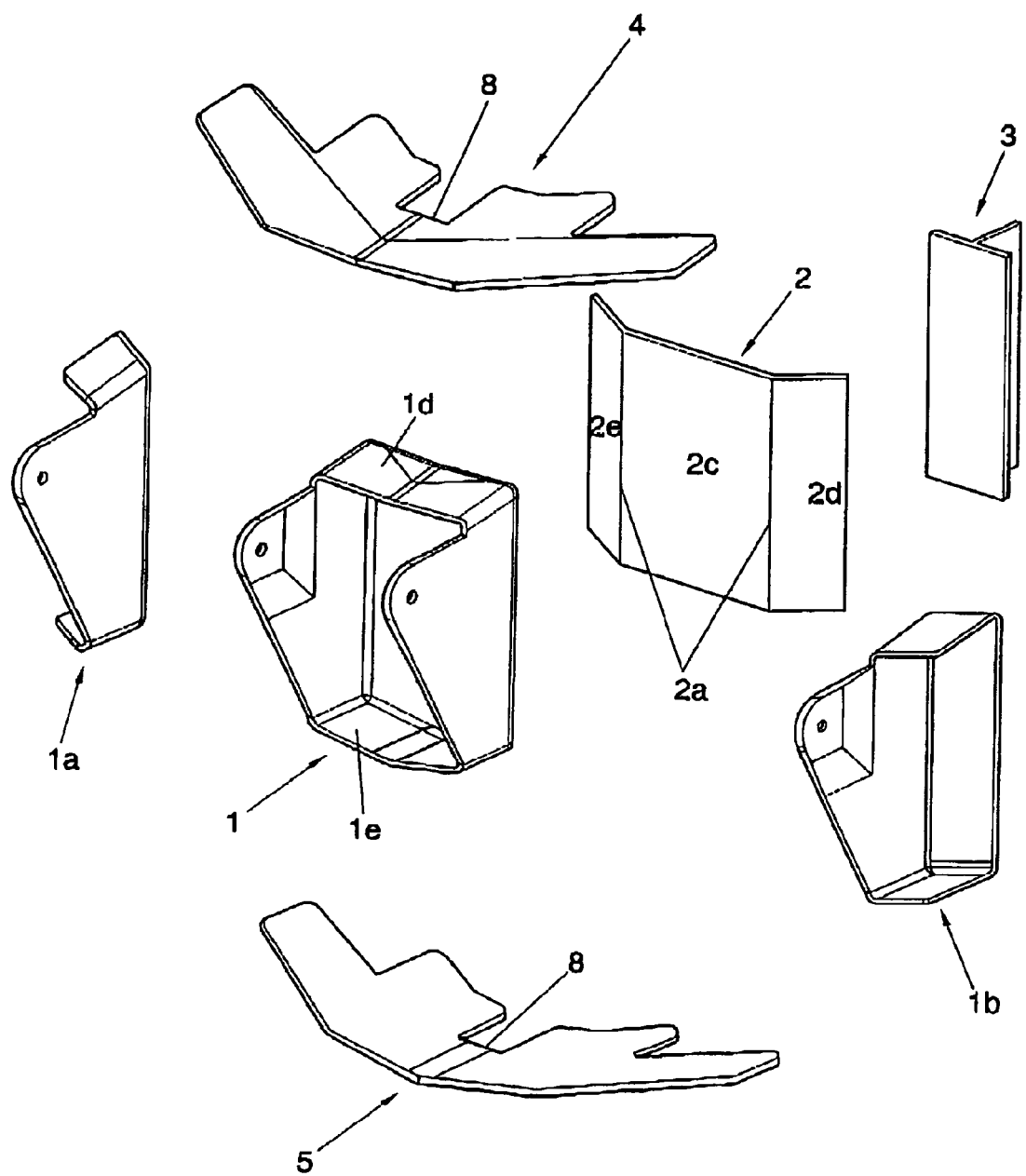
FIG. 2 shows a view in exploded perspective of the pieces comprising the assembly forming the solution proposed by the present invention.

FIG. 2 shows all the pieces comprising the assembly forming the solution of the present invention.

Said assembly comprises:
- a front fitting (1, 1a and 1b),
- a front shear plate (2),
- an upper shear plate (4),
- a lower shear plate (5), and
- a "rib post" union piece (3), the union piece for the central rib of the horizontal stabilizer.

Figure 3:
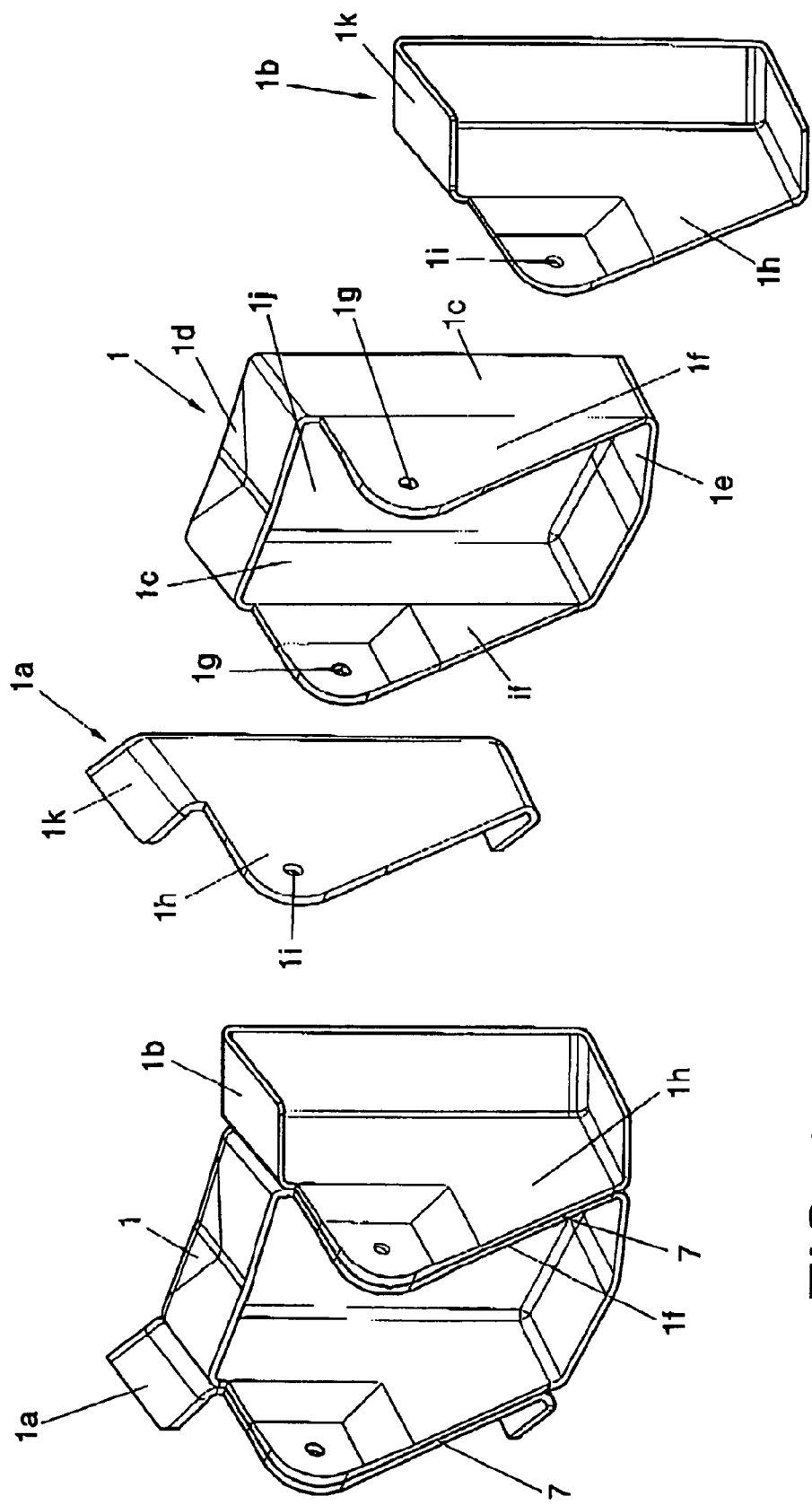
FIG. 3 shows a view in perspective of the front fitting of the present invention.

FIG. 3 shows that the front fitting consists of a central body (1) and two lateral parts (1a and 1b), with the characteristics specified below.

FIG. 3a shows that the central body (1) of the front fitting is a body of rectangular base (1j) which presents a shape similar to that of a box, whose longer lateral walls (1c) are arranged vertically, are parallel and symmetric to each other and emerging from them are individual lugs (1f) coplanar with the lateral walls (1c). Each lug (1f) possesses an opening (1g). Moreover, the shorter lateral walls (1d and 1e) of the central body (1), in other words the upper wall (1d) and the lower wall (1e), are neither parallel nor symmetric to each other, the lower wall (1e) being slightly concave with respect to the upper wall (1d).

Likewise, each of the two lateral parts (1a and 1b) of the front fitting presents a lateral side (1h) symmetric to the lateral wall (1c) with the lug (1f) and opening (1g). In other words, each lateral side (1h) of each lateral part (1a and 1b) of the front fitting copies the contour of the lateral wall (1c) with the lug (1f) and the opening (1g). So, each lateral side (1h) of each lateral part (1a and 1b) of the front fitting includes a lug with opening (1i). Moreover, each lateral side (1h) of each lateral part (1a and 1b) of the front fitting possesses a projecting edge (1k) running along almost its entire outer contour, with the exception of the contour of the lug.

The front fitting can be separate in its three fundamental parts, central body (1) plus two lateral parts (1a and 1b), and these can be joined either during the manufacturing process or by means of a secondary gluing process, or they can be manufactured in a single piece.

As can be seen in FIG. 3, once the three fundamental parts have been joined together, the resulting fitting possesses two resulting lugs (7) which are formed by the union of a lug (1f) of the central body (1) and the lug of each lateral side (1h) of each corresponding lateral part (1a or 1b). With this, a resulting lug (7) is achieved with a double load path. Moreover, in the case of one of the two sides of the resulting lug (7) failing, the other one will be the one that withstands the limit load, thereby complying with aviation requirements.

Figure 4:
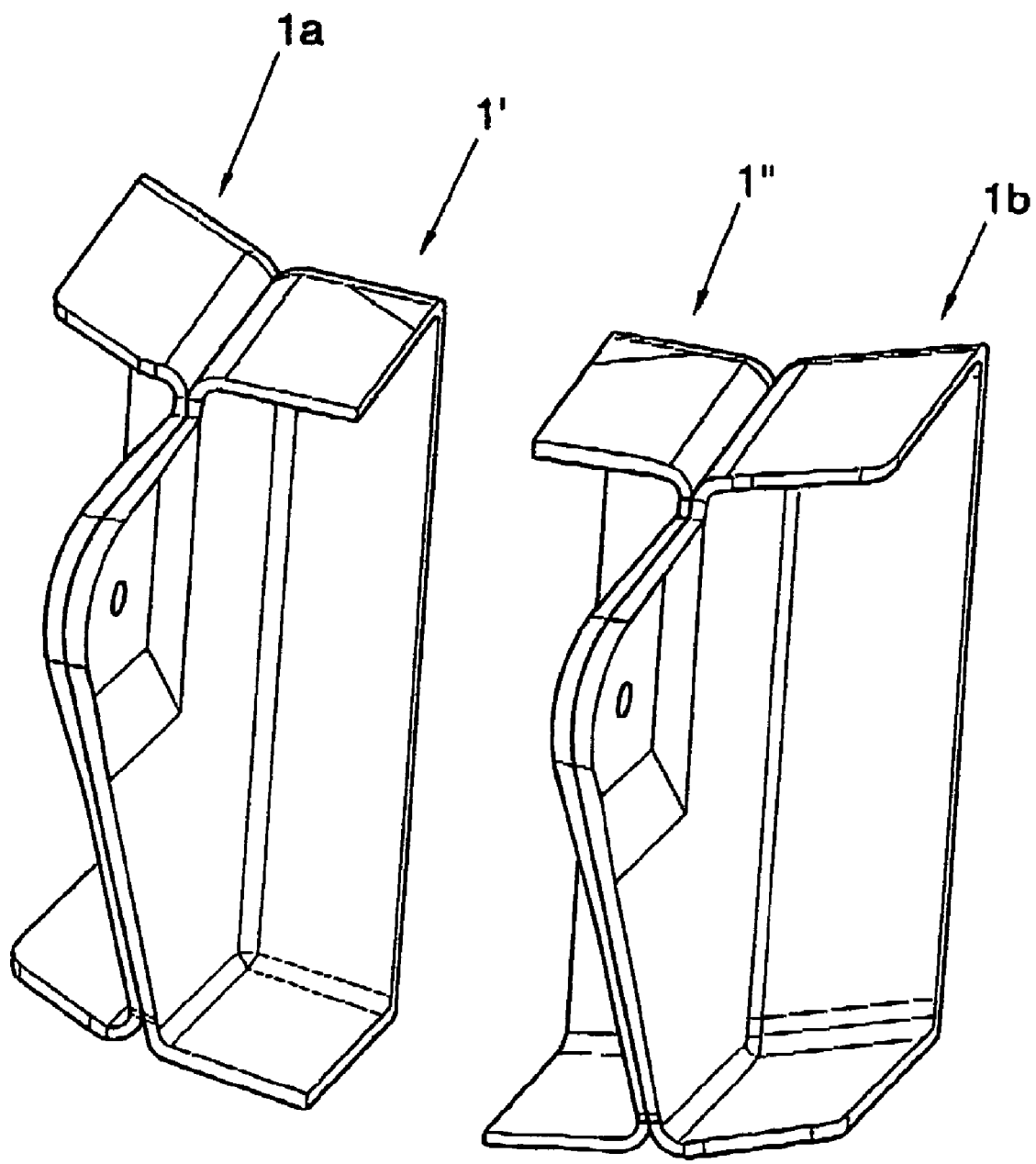
FIG. 4 shows a view in perspective of a second embodiment of the front fitting of the present invention, the central body (1) of which is divided into two sub-halves (1' and 1")

In FIG. 4 it can be seen that, in an alternative embodiment, the central body of the front fitting is divided into two sub-halves (1') and (1"), each of them joined to one of the lateral parts (1a or 1b).

From FIG. 2 it is revealed that the front shear plate (2) of the present invention comprises a plate possessing two vertical folding lines (2a) that define a central zone (2c) and two lateral zones (2d and 2e).

Figure 5A:
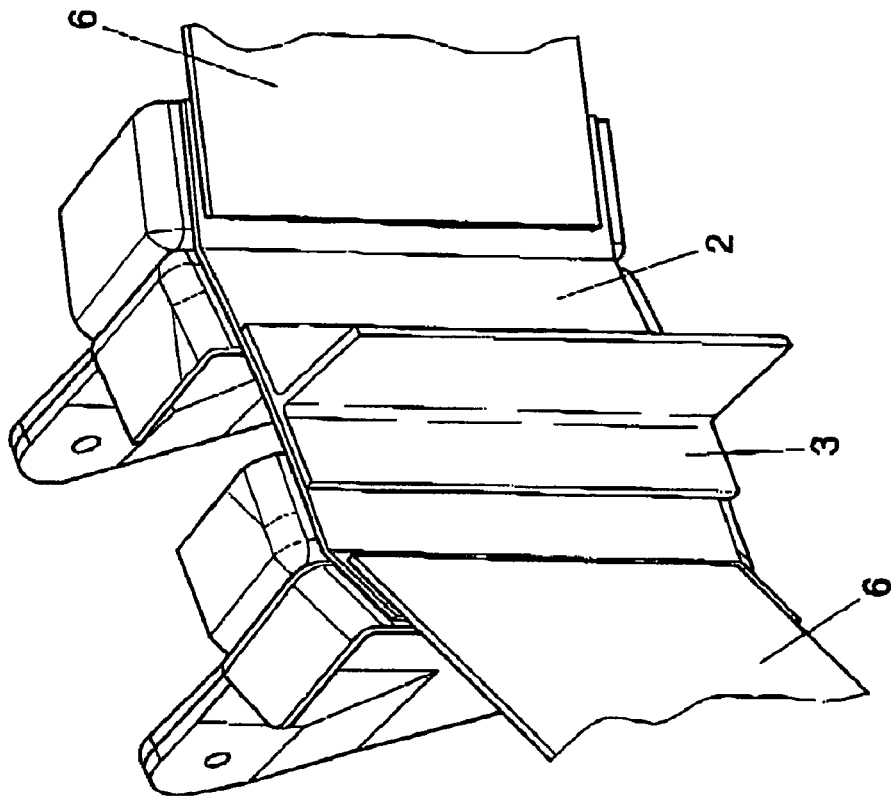
FIG. 5a shows a view in perspective of the assembly formed by the front fitting according to the second embodiment, and the front shear plate (2)
Figure 5B:
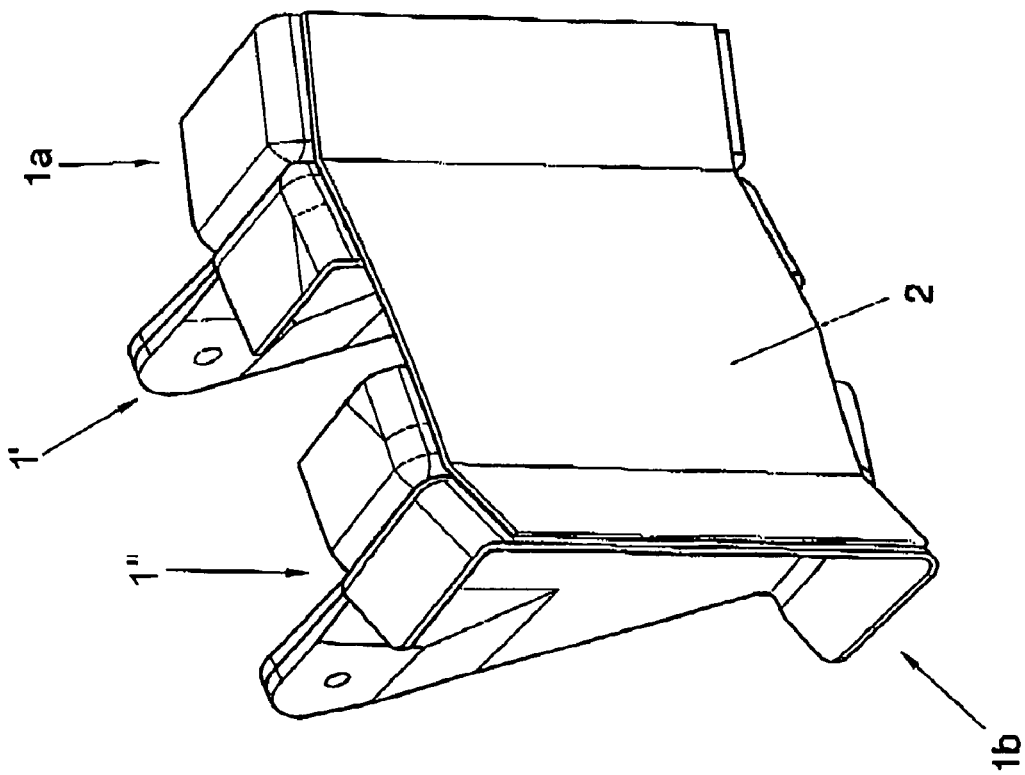
FIG. 5b shows a view in perspective of the assembly formed by the front fitting according to the second embodiment, the front shear plate (2) and the "rib post"union piece (3); also shown are the front spars (6) of the two lateral boxes.

From FIGS. 2, 5a and 5b it is revealed that the front shear plate (2), as a result of its two lateral zones (2d and 2e), is joined to a part of the projecting edge (1k) of each lateral part (1a and 1b) at the same time as being joined to the two spar webs of the two front spars (6) arriving from each of the lateral boxes of the horizontal stabilizer in such a way as to receive the vertical load coming from the front fitting.

From FIGS. 5a and 5b it is revealed that, in the alternative embodiment described above, in other words, the one in which the central body of the front fitting is divided into two sub-halves (1' and 1"), the front shear plate (2) is responsible for providing continuity for the central body of the front fitting.

From FIGS. 2 and 5b it is revealed that the "rib post" union piece (3) has a "T" shape cross-section and is attached to the front shear plate (2) in the middle zone of its central zone (2c), by means of processes of cocuring, cogluing or riveting. The function of the "rib post" union piece (3) is to join the central rib of the horizontal stabilizer of the aircraft to the front shear plate (2) in such a way as to transmit the vertical load of the front fitting to the central rib of the horizontal stabilizer.

As an advantage of the inclusion of the front shear plate (2), the vertical load introduced by the front fitting is transmitted by shear to the core of the front spars (6) of the lateral boxes of the horizontal stabilizer and, by means of the "rib post" union piece (3), it is transmitted to the central rib of the stabilizer. Moreover, the front shear plate (2) also provides continuity for the shear load borne by the front spars (6) of the lateral boxes of the horizontal stabilizer.

Figure 7:
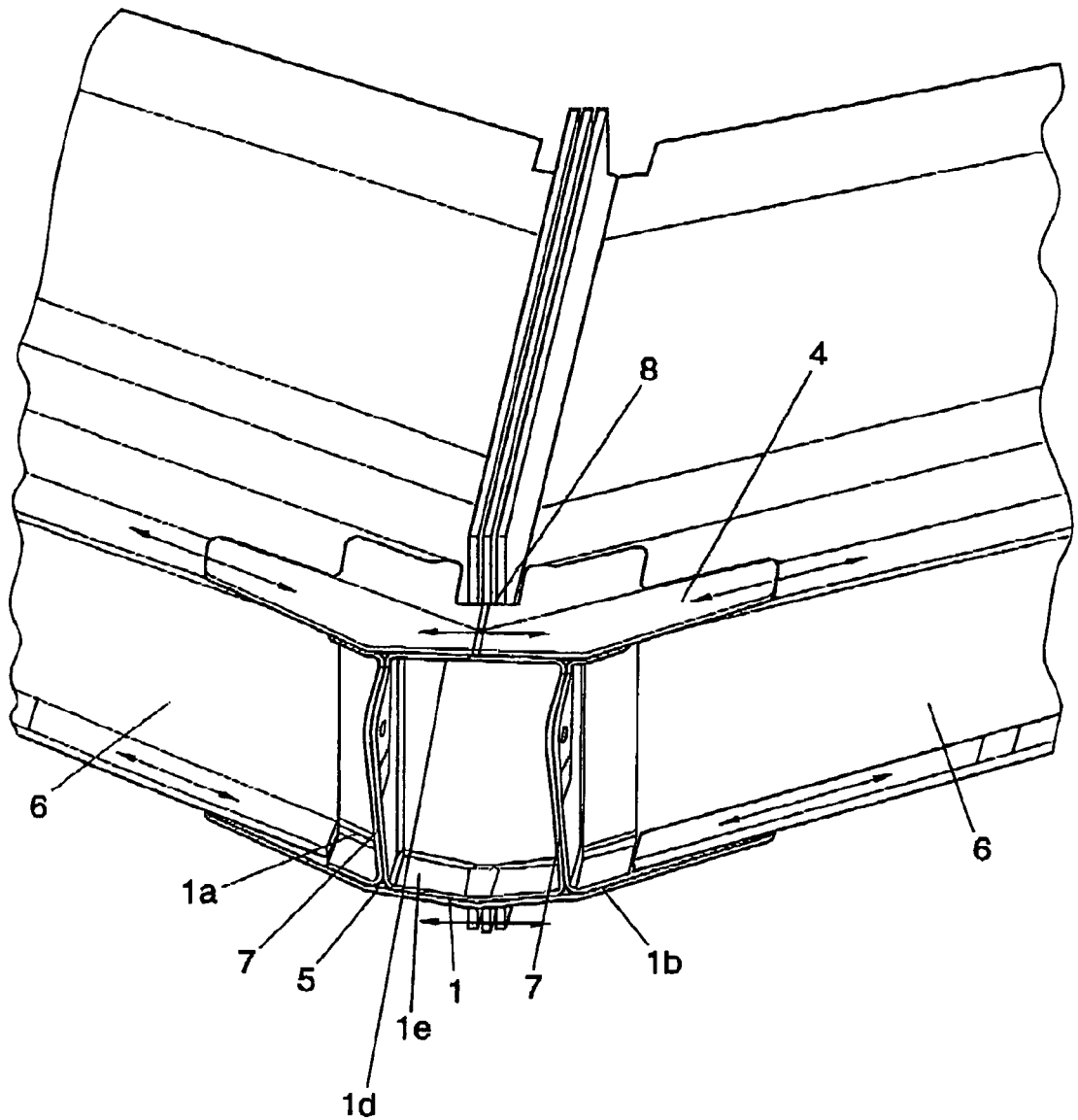
FIG. 7 shows a front view of the assembly of the present invention, mounted in the traction coupling of the lateral boxes (6) of the horizontal stabilizer. Also shown, with arrows, are the traction-compression loads that pass through the upper and lower shear plates, from one side to the other of the lateral boxes of the stabilizer.

From FIGS. 2 and 7 it is revealed that the upper (4) and lower (5) shear plates are two plates that have a characteristic shape such that they can be arranged following the contour or copying the upper and lower shape or contour of the front fitting in order to join it to the upper and lower skins of the torsion boxes. Furthermore, said upper and lower shear plates (4 and 5) are extended beyond the area covered by the front fitting, both laterally and towards the rear part of the stabilizer. In this way, the upper and lower shear plates (4 and 5) are successfully joined to the upper and lower skins forming the torsion box. Moreover, in order to span the space occupied by the central rib, both upper and lower shear plates (4 and 5) possess a slot (8). It is important to emphasize that the shape of the upper and lower shear plates (4 and 5) that can be seen in FIGS. 2 and 7 is merely schematic and they admit a contour with a different shape without altering their functionality.

The main function of the upper (4) and lower (5) shear plates is to react to the moment introduced into the structure by the vertical load introduced by the front fitting. Moreover, the upper (4) and lower (5) shear plates give continuity to the traction-compression loads coming from the upper and lower part (or strands) of the front spars (6) of both lateral boxes of the horizontal stabilizer.

Finally, the upper (4) and lower (5) shear plates serve to complete the closure of the lateral boxes in the plane of union, considerably increasing their resistance to torsion.

Figure 6:
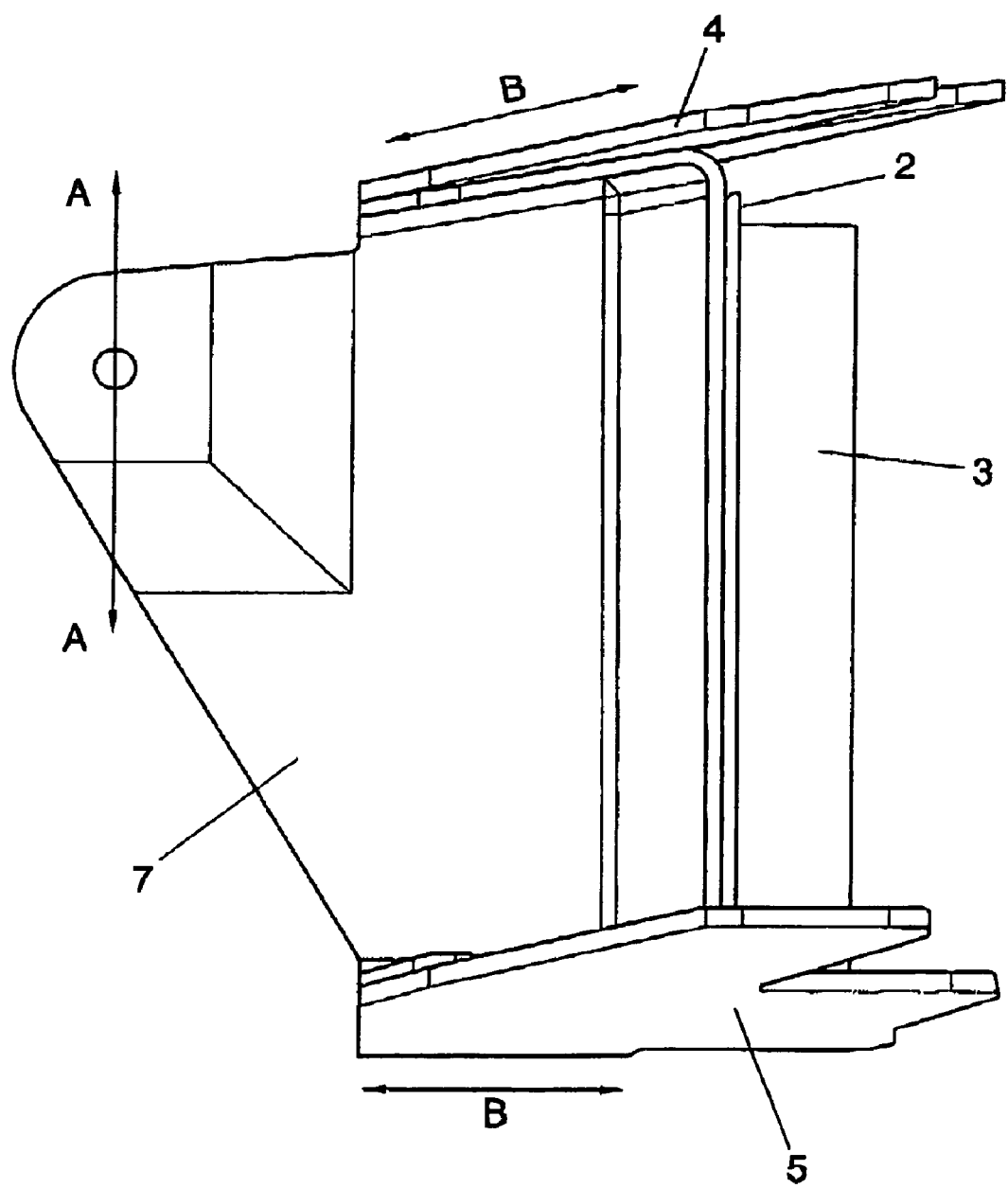
FIG. 6 shows a lateral view of the assembly of FIG. 5b with the upper (4) and lower (5) shear plates and where the loads that appear have been represented with arrows (A and B)

Represented in FIG. 6 with arrows are the loads that appear, arrow (A) corresponding to the loads introduced by the front fitting and arrow (B) to the loads appearing as a consequence of the moment which that vertical load produces.

FIG. 7 shows the complete assembly fitted in the traction coupling of the two lateral boxes of the horizontal stabilizer. It also shows with arrows the traction-compression loads passing through the upper (4) and lower (5) shear plates, from one side to the other of the lateral boxes (6) of the horizontal stabilizer.

As has been mentioned earlier it is also an object of the present invention to describe the aforementioned front fitting, made of one piece, in other words compact, and in composite material.

The invention claimed is:

1. ASSEMBLY BETWEEN A FRONT FITTING AND THE TRACTION COUPLING OF THE TWO LATERAL BOXES OF THE HORIZONTAL STABILIZER OF AN AIRCRAFT comprising:
    a front fitting;
    a front shear plate;
    an upper shear plate;
    a lower shear plate; and
    a "rib post" union piece,
wherein the front fitting comprises a central body and two lateral parts; the central body comprising:
    a rectangular base,
    two lateral walls parallel and symmetric to each other, from which emerge individual lugs coplanar to said lateral walls, and
    two walls, shorter than the previous lateral walls, which constitute an upper wall and a lower wall; said upper and lower walls being neither parallel nor symmetric to each other, in such a way that the lower wall is concave with respect to the upper wall.

2. ASSEMBLY according to claim 1, wherein each of the lugs emerging from the lateral walls of the central body of the front fitting has an opening.

3. FRONT FITTING forming part of the assembly described in claim 2, wherein it comprises a central body and two lateral parts forming a single piece of composite material, such that the central body has:
    a rectangular base;
    two lateral walls parallel and symmetric to each other, from which emerge individual lugs coplanar to said lateral walls, such that each lug has an opening; and
    two walls, shorter than the previous lateral walls, which constitute an upper wall and a lower wall; said upper and lower walls being neither parallel nor symmetric to each other, in such a way that the lower wall is concave with respect to the upper wall;
and the two lateral parts have a lateral side symmetric to each of the lateral walls with its lug of the central body; each one of the lateral sides of the lateral walls furthermore including a lug with opening and a projecting edge running along almost its entire outer contour, with the exception of the contour corresponding to the lug; and
all this forming a single piece manufactured in composite material.

4. ASSEMBLY according to claim 1, wherein the two lateral parts of the front fitting have a lateral side symmetric to each of the lateral walls with the lug of the central body of the front fitting; each one of the lateral sides of the lateral parts of the front fitting furthermore including a lug with opening and a projecting edge running along almost its entire outer contour, with the exception of the contour corresponding to the lug.

5. FRONT FITTING forming part of the assembly described in claim 4, wherein it comprises a central body and two lateral parts forming a single piece of composite material, such that the central body has:
   a rectangular base;
   two lateral walls parallel and symmetric to each other, from which emerge individual lugs coplanar to said lateral walls, such that each lug has an opening; and
   two walls, shorter than the previous lateral walls, which constitute an upper wall and a lower wall; said upper and lower walls being neither parallel nor symmetric to each other, in such a way that the lower wall is concave with respect to the upper wall;
and the two lateral parts have a lateral side symmetric to each of the lateral walls with its lug of the central body; each one of the lateral sides of the lateral walls furthermore including a lug with opening and a projecting edge running along almost its entire outer contour, with the exception of the contour corresponding to the lug; and
all this forming a single piece manufactured in composite material.

6. ASSEMBLY according to claim 1, wherein the upper and lower shear plates are two plates that have a geometric shape such that copies the upper and lower contour of the front fitting; each upper and lower shear plate is extended beyond the area covered by the front fitting, both laterally and towards the rear part of the stabilizer and each upper and lower shear plate has a slot for allowing copying of the contour of the traction coupling of the two lateral boxes of the horizontal stabilizer.

7. FRONT FITTING forming part of the assembly described in claim 6, wherein it comprises a central body and two lateral parts forming a single piece of composite material, such that the central body has:
   a rectangular base;
   two lateral walls parallel and symmetric to each other, from which emerge individual lugs coplanar to said lateral walls, such that each lug has an opening; and
   two walls, shorter than the previous lateral walls, which constitute an upper wall and a lower wall; said upper and lower walls being neither parallel nor symmetric to each other, in such a way that the lower wall is concave with respect to the upper wall;
and the two lateral parts have a lateral side symmetric to each of the lateral walls with its lug of the central body; each one of the lateral sides of the lateral walls furthermore including a lug with opening and a projecting edge running along almost its entire outer contour, with the exception of the contour corresponding to the lug; and
all this forming a single piece manufactured in composite material.

8. ASSEMBLY according to claim 1, wherein the central body and two lateral parts of the front fitting constitute a single piece manufactured in composite material.

9. FRONT FITTING forming part of the assembly described in claim 8, wherein it comprises a central body and two lateral parts forming a single piece of composite material, such that the central body has:
   a rectangular base;
   two lateral walls parallel and symmetric to each other, from which emerge individual lugs coplanar to said lateral walls, such that each lug has an opening; and
   two walls, shorter than the previous lateral walls, which constitute an upper wall and a lower wall; said upper and lower walls being neither parallel nor symmetric to each other, in such a way that the lower wall is concave with respect to the upper wall;
and the two lateral parts have a lateral side symmetric to each of the lateral walls with its lug of the central body; each one of the lateral sides of the lateral walls furthermore including a lug with opening and a projecting edge running along almost its entire outer contour, with the exception of the contour corresponding to the lug; and
all this forming a single piece manufactured in composite material.

10. ASSEMBLY according to claim 1, wherein the central body of the front fitting is divided into two sub-halves.

11. FRONT FITTING forming part of the assembly described in claim 10, wherein it comprises a central body and two lateral parts forming a single piece of composite material, such that the central body has:
    a rectangular base;
    two lateral walls parallel and symmetric to each other, from which emerge individual lugs coplanar to said lateral walls, such that each lug has an opening; and
    two walls, shorter than the previous lateral walls, which constitute an upper wall and a lower wall; said upper and lower walls being neither parallel nor symmetric to each other, in such a way that the lower wall is concave with respect to the upper wall;
and the two lateral parts have a lateral side symmetric to each of the lateral walls with its lug of the central body; each one of the lateral sides of the lateral walls furthermore including a lug with opening and a projecting edge running along almost its entire outer contour, with the exception of the contour corresponding to the lug; and
all this forming a single piece manufactured in composite material.

12. ASSEMBLY according to claim 1, wherein the front fitting, the front shear plate, the upper shear plate, the lower shear plate and the "rib post" union piece are made of composite material.

13. ASSEMBLY according to claim 12, wherein the means of union between the surfaces of the different component pieces consist of rivets.

14. FRONT FITTING forming part of the assembly described in claim 1, wherein it comprises a central body and two lateral parts forming a single piece of composite material, such that the central body has:
    a rectangular base;
    two lateral walls parallel and symmetric to each other, from which emerge individual lugs coplanar to said lateral walls, such that each lug has an opening; and
    two walls, shorter than the previous lateral walls, which constitute an upper wall and a lower wall; said upper and lower walls being neither parallel nor symmetric to each other, in such a way that the lower wall is concave with respect to the upper wall;
and the two lateral parts have a lateral side symmetric to each of the lateral walls with its lug of the central body; each one of the lateral sides of the lateral walls furthermore including a lug with opening and a projecting edge running along almost its entire outer contour, with the exception of the contour corresponding to the lug; and
all this forming a single piece manufactured in composite material.

15. FRONT FITTING forming part of the assembly described in claim 1, wherein it comprises a central body and two lateral parts forming a single piece of composite material, such that the central body has:
    a rectangular base;
    two lateral walls parallel and symmetric to each other, from which emerge individual lugs coplanar to said lateral walls, such that each lug has an opening; and two walls, shorter than the previous lateral walls, which constitute an upper wall and a lower wall; said upper and lower walls being neither parallel nor symmetric to each other, in such a way that the lower wall is concave with respect to the upper wall;

and the two lateral parts have a lateral side symmetric to each of the lateral walls with its lug of the central body; each one of the lateral sides of the lateral walls furthermore including a lug with opening and a projecting edge running along almost its entire outer contour, with the exception of the contour corresponding to the lug; and all this forming a single piece manufactured in composite material.

16. ASSEMBLY BETWEEN A FRONT FITTING AND THE TRACTION COUPLING OF THE TWO LATERAL BOXES OF THE HORIZONTAL STABILIZER OF AN AIRCRAFT comprising:
- a front fitting;
- a front shear plate;
- an upper shear plate;
- a lower shear plate; and
- a "rib post" union piece, wherein the front shear plate comprises a plate with two vertical folding lines which define a central zone and two lateral zones and, by means of the two lateral zones, the front shear plate is able to be joined to some spars of the lateral boxes of the horizontal stabilizer and wherein the "rib post" union piece has a "T" shape cross-section and is joined to the front shear plate in the middle of its central zone by means of processes of cocuring, cogluing or riveting.

17. FRONT FITTING forming part of the assembly described in claim 16, wherein it comprises a central body and two lateral parts forming a single piece of composite material, such that the central body has:
- a rectangular base;
- two lateral walls parallel and symmetric to each other, from which emerge individual lugs coplanar to said lateral walls, such that each lug has an opening; and
- two walls, shorter than the previous lateral walls, which constitute an upper wall and a lower wall; said upper and lower walls being neither parallel nor symmetric to each other, in such a way that the lower wall is concave with respect to the upper wall;

and the two lateral parts have a lateral side symmetric to each of the lateral walls with its lug of the central body; each one of the lateral sides of the lateral walls furthermore including a lug with opening and a projecting edge running along almost its entire outer contour, with the exception of the contour corresponding to the lug; and all this forming a single piece manufactured in composite material.

\* \* \* \* \*